United States Patent

Furlong et al.

[11] 3,769,922
[45] Nov. 6, 1973

[54] FLUID BED REACTOR PRE-HEATING METHOD AND APPARATUS

[75] Inventors: Dale A. Furlong; Alan H. Schmid, both of Sunnyvale, Calif.

[73] Assignee: Combustion Power Inc., Menlo Park, Calif.

[22] Filed: Dec. 30, 1971

[21] Appl. No.: 213,962

[52] U.S. Cl. .............. 110/28 J, 34/57 R, 122/4 D, 165/106
[51] Int. Cl. ............................................. F23d 19/00
[58] Field of Search .................. 110/28 J, 8 R; 34/57 R; 165/106; 122/4 D

[56] References Cited
UNITED STATES PATENTS 3,146,074  8/1964  Drechsel et al. .................. 165/106
2,818,049  12/1957  Blaskowski et al. .............. 122/4 D

FOREIGN PATENTS OR APPLICATIONS 890,986  3/1962  Great Britain ................. 110/28 J Primary Examiner—William F. O'Dea
Assistant Examiner—James C. Yeung
Attorney—Karl A. Limbach et al.

[57] ABSTRACT

A quantity of finely divided inert particles is fluidized by a high velocity stream of cold air directed against the particles from the bottom while waste material is fed into the fluidized particles from the top. The particles are initially pre-heated to a temperature sufficient to cause combustion of the waste material by passing a low velocity stream of hot air through the volume of particles from its top to its bottom.

4 Claims, 2 Drawing Figures

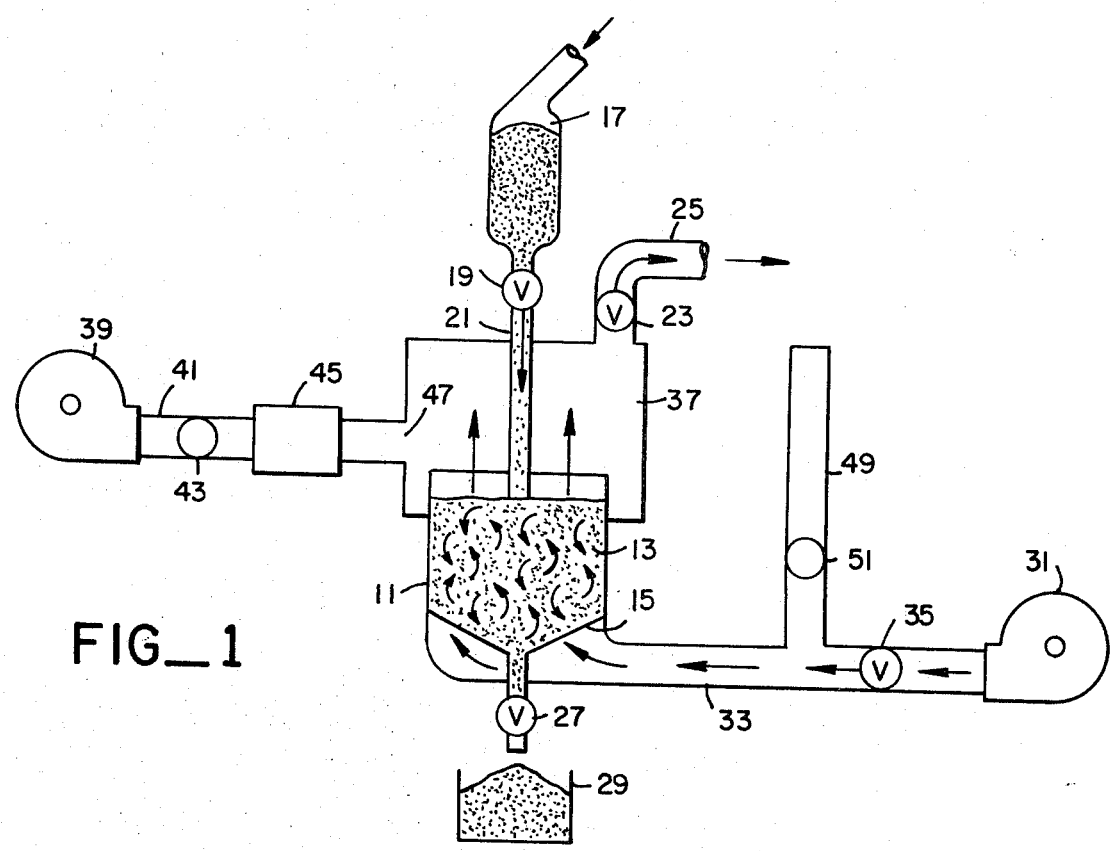
FIG_1
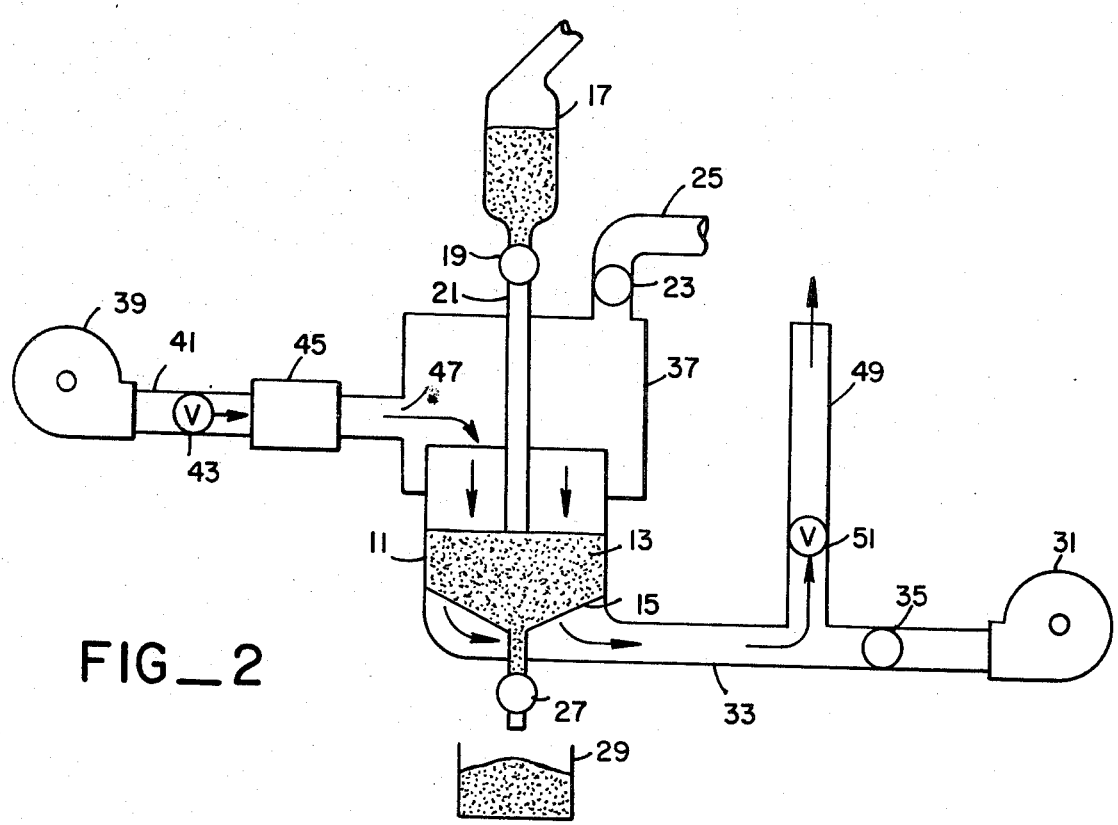
FIG_2

FLUID BED REACTOR PRE-HEATING METHOD AND APPARATUS

BACKGROUND OF THE INVENTION

The invention described herein was made in the course of or under a contract with the Department of Health, Education and Welfare.

This invention relates generally to fluid bed reactors and more specifically to a method and apparatus for pre-heating the particles of a fluid bed reactor.

With a recent emphasis on ecology and the problems of disposing of waste material, fluid bed reactors have been employed as a means of disposing of combustible waste materials. In a fluid bed reactor, a quantity of inert particles, such as sand, is supported by a porous grate within a combustion chamber. The particles are "fluidized" by directing a stream of high velocity air into the bottom of the combustion chamber and up into the quantity of particles through the porous support grate. The stream of air lifts some of the particles and causes a turbulent flow in the nature of a fluid flow. Waste material is inserted into the combustion chamber from above the fluid bed. Once the fluid bed particles are hot enough to begin combustion of the waste material, the temperature of the fluid bed is sustained by released energy from continued burning of waste material.

Each time a fluid bed reactor is placed into operation after a period of idle time, the fluid bed particles must be pre-heated in order to begin combustion of waste material. One way in which fluid bed particles are pre-heated in present reactors is with the use of a hot flame that is directed onto the top surface of the particles of the bed. The exhaust gases from this hot jet are exhausted out of a conventional exhaust near the top of the combustion chamber that is normally used to exhaust gases resulting from combustion of the water material. The high temperatures resulting from the application of a direct flame within the combustion chamber requires that precautions be taken not to injure the particles or the apparatus.

Another technique for pre-heating the fluidized bed particles is to heat the fluidizing air stream that is directed into the chamber at its bottom and up through the bed particles. This technique suffers from the disadvantages that the air blower power consumption is high, the amount of fuel required to heat the air sufficiently is high, and the porous grate that supports the fluidized bed particles is subjected to a very high temperature.

Yet another method of pre-heating the fluidized bed particles is to simultaneously introduce into the combustion chamber the fluidized bed particles and fuel for simultaneous bed filling and heating. This technique suffers from the disadvantages of requiring the high blower power and fuel consumption. Additionally, the particles must be moved into and out of the chamber during each operating cycle. An unscheduled shut-down of the reactor and a resulting cooling of the bed particles requires a special start-up sequence which is undesirable.

It is a primary object of the present invention to provide a technique of pre-heating fluidized bed reactor particles with reduced air blower power consumption and air heating fue consumption without having to remove the fluid bed particles from the reaction each time it is shut down.

SUMMARY OF THE INVENTION

This and additional objects of the present invention are accomplished by directing a low velocity stream of pre-heated air, or another suitable gas, in a path through the reactor particle bed from its top surface, out of the bottom of the particle bed and through an exhaust opening in the bottom of the combustion chamber. The low velocity requirement of the pre-heating stream allows the use of an air blower having reduced power input requirements. Heat is transferred from the pre-heated air stream to the particle bed in an efficient manner and the air is exhausted from the bottom of the particle bed with a low temperature, thereby not causing any damage to the particle bed supporting porous screen or the the cold fluidized air inlet orifice at the bottom of the combustion chamber. Routine insertion and removal of complete bed material on each start-up and shut-down of the reactor is not required as it is with certain other pre-heating techniques. The fluid bed particles may be pre-heated with the bed initially at any temperature. The pre-heat equipment is simple, requiring only a blower and a pre-heat combustor and thus lends itself to automatic pre-heat cycle control. The time necessary to pre-heat a fluid bed is also low compared to other pre-heating techniques.

Additional objects and advantages of the present invention will become apparent from the following description when taken in conjunction with the accompanying drawings.

BRIEF DESCRIPTION OF THE DRAWINGS

FIG. 1 schematically illustrates a fluid bed reactor that is operating with waste material being fed into the fluid bed for combustion thereof; and FIG. 2 schematically illustrates the fluid bed reactor of FIG. 1 in its pre-heating mode of operation.

DESCRIPTION OF THE PREFERRED EMBODIMENT

Referring to FIG. 1, a combustion chamber 11 in the form of a fluid bed reactor includes sand or other inert particles 13 contained above a porous grate 15. The particles 13 are suspended or fluidized during operation of the fluid bed reactor by passing a stream or air therethorugh from the bottom of the particles 13. Limestone or dolomite can be added to the particle bed for control of noxious gases.

Shredded dry waste material is inserted into a storage chamber 17. The waste material is gravity fed at a controlled rate through a valve 19 and a vertical pipe 21 into the combustion chamber 11. As the shredded waste material is fed into the fluidized bed of particles 13, a chemical reaction takes place whereby most of the waste material is consumed. The product of combustion of the waste material is forced out of the combustion chamber 11 through a valve 23 and an exhaust pipe 25. Portions of the waste material which are inert will sink to the bottom of the fluidized bed 13 and will be removed therefrom through an air locked feeder 27 and combined with other ash in a residue storage container 29.

A high powered blower 31 takes air from the atmosphere (or some other gas from a storage medium) and significantly raises the pressure within an inlet pipe 33. A high velocity stream of air travels along the inlet pipe 33 through an open valve 35 and into the combustion chamber 11. As shown by the arrows of FIG. 1, the stream passes upward through the porous grate 15, into the fluid bed particles 13, then into a chamber 37 positioned above the combustion chamber 11, and out through the exhaust pipe 25 by means of the open valve 23. The stream of air within the inlet pipe 33 need not be heated for operation of the fluid bed reactor.

The fluidized bed promotes dispersion of incoming shredded and dry solid waste material which is heated to its ignition temperature and maintained in the fluid bed for a sufficient time to result in combustion of all burnable solid waste particles. The velocity of air through the bed as directed thereto through the inlet pipe 33, and hence the pressure drop across the fluid bed 13, must be greater than that value required to support the weight of the fluid bed but less than the value required to sweep the fluid bed particles out of the combustion chamber 11. When these conditions are satisfied, the bed particles exist in a fluidized state. If the movement of one specific particle could be observed, it would undergo a continuous turbulent motion, being buoyed by flowing gas from the inlet pipe 33 and would not be at rest against adjacent particles. Superimposed upon this localized motion are convection motions of the entire fluidized bed. Viewed as a whole, the dynamic condition of a fluidized bed is analogous to that of boiling liquid. The high pressure and turbulence in the fluid bed 13 combine to promote rapid combustion of the solid waste material.

The pre-heating technique of the present invention is described with respect to FIG. 2 which shows the same fluid bed reactor that is illustrated in FIG. 1 but in a different operating mode. The valve 19 which controls the flow of waste material into the fluid bed is closed. The fluid bed particles 13 are not fluidized but rather are held by gravity against the porous supporting grate 15. If the particles of the fluid bed 13 are below the temperature necessary to support combustion of waste material, the fluid bed particles 13 must be pre-heated before waste material can be consumed thereby.

A low capacity blower 39 forms a stream of gas, preferably air, within a pipe 41. This stream of air passes through an open valve 43 and into a pre-heat combustor 45. The products of combustion plus excess air are mixed to yield the desired pre-heated gas temperature. The pre-heated air is then passed into the chamber 37 through an opening 47 therein.

In order to pass the pre-heated air from the inlet 47 down through the fluidized bed particles 13, the inlet air pipe 33 that communicates with the bottom of the fluid bed 13 is opened to the atmosphere. A preheat exhaust stack 49 is provided for this purpose and communicates through an open valve 51 with the inlet pipe 33. With the valve 23 of the outlet pipe 25 from the combustion chamber in a closed position, as shown in FIG. 2, the only escape of the pre-heated air entering the combustion chamber through the inlet 47 is through the inlet pipe 33 and out through the pre-heat exhaust stack 49. The fluidizing air inlet valve 35 is closed during the pre-heat operation, as shown in FIG. 2.

When the fluidized bed particles 13 have reached the desired temperature, the pre-heat blower 39 and the pre-heat combustor 47 are shut down and the various air valves reset for operation as shown in FIG. 1. The pre-heat air valve 43 and the pre-heat exhaust valve 51 are closed while the valves 23 and 35 are reopened to permit flow of fluidizing air up through the fluid bed 13.

The techniques of the present invention have been described according to a preferred embodiment, but it will be understood that the scope of the invention is defined by the appended claims.

What is claimed is:

1. In a fluid bed combustion apparatus having
a container enclosing a combustion chamber,
a porous grate within said combustion chamber,
a quantity of finely divided inert fluid bed particles normally resting by gravity on said grate, and
means including an opening into the combustion chamber under said grate for the passage of a stream of gas therethrough to fluidize said finely divided particles,
an improvement for pre-heating said fluid bed particles, comprising,
means for forcing a stream of heated gas into said combustion chamber above the fluid bed particles, and,
means beneath said porous grate for opening the combustion chamber to the atmosphere, whereby the stream of pre-heated gas passes through the fluid bed from top to bottom to heat the particles and subsequetly be discharged as cool air at the bottom of the combustion chamber.

2. The improved fluid bed combustion apparatus of claim 1 wherein said means for forcing a stream of heated gas into said combustion chamber includes a blower for delivering air under pressure to a pre-heat combustor, said comsutor communicating with said combustion chamber for discharge of the pre-heated air under pressure thereinto.

3. In a fluid bed combustion apparatus having,
a combustion chamber,
a porous grate within said combustion chamber and extending thereacross,
a quantity of finely divided inert particles within said combustion chamber contained above said grate,
a first opening into said combustion chamber at its bottom under said grate,
a second opening at an upper portion of said combustion chamber above said particles, and
means communicating with said first opening for fluidizing said quantity of finely divided particles by passing a stream of unheated air under pressure through said first opening, whereby said stream of air passes up through the quantity of particles and out through said second opening,
an improvement for pre-heating said quantity of particles, comprising,
means outside of said combustion chamber for generating a stream of air at an elevated temperature and pressure,
means for communicating said stream of air from said generating means into said combustion chamber above said quantity of particles,
valve means for communicating said first opening at the bottom of said combustion chamber to the outside atmosphere, and
valve means for closing the second opening near the top of said combustion chamber, whereby a stream of air of elevated temperature and pressure may be caused to pass into the top of the combustion chamber and downward through the quantity of particles and out of said chamber through said first opening.

4. In a fluid bed reactor having inert fluid bed solid particles contained above a porous grate within a combustion chamber, a method of pre-heating the fluid bed particles, comprising the steps of:

forming a stream of pre-heated gas, passing for a period of time said stream of pre-heated gas downward through the inert fluid bed solid particles while the weight of said particles is supported by said grate, thereby to preheat said fluid bed particles, and, passing after said period of time a second stream of gas upward through the preheated particles in a manner to fluidize said bed.

* * * * *